US009673849B1

(12) United States Patent
Paraschou et al.

(10) Patent No.: US 9,673,849 B1
(45) Date of Patent: Jun. 6, 2017

(54) COMMON MODE EXTRACTION AND TRACKING FOR DATA SIGNALING

(71) Applicant: Advanced Micro Devices, Inc., Sunnyvale, CA (US)

(72) Inventors: Milam Paraschou, Dellwood, MN (US); Edoardo Prete, Arlington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/237,754

(22) Filed: Aug. 16, 2016

(51) Int. Cl.
  *H04B 1/10*   (2006.01)
  *H04B 1/76*   (2006.01)
  *H04B 15/00*  (2006.01)

(52) U.S. Cl.
  CPC ............... *H04B 1/10* (2013.01); *H04B 1/76* (2013.01); *H04B 15/00* (2013.01)

(58) Field of Classification Search
  CPC .. H04B 1/10; H04B 1/76; H04B 15/00; H04L 27/2071; H04L 25/085
  See application file for complete search history.

(56) References Cited

U.S. PATENT DOCUMENTS

| | | | |
|---|---|---|---|
| 4,295,063 A | 10/1981 | Price, Jr. | |
| 5,083,046 A | 1/1992 | Nagasawa | |
| 5,530,444 A | 6/1996 | Tice et al. | |
| 5,541,538 A | 7/1996 | Bacrania et al. | |
| 5,942,921 A | 8/1999 | Talaga, Jr. | |
| 6,154,498 A * | 11/2000 | Dabral | G06F 13/4072 327/141 |
| 6,801,584 B1 * | 10/2004 | Williams | H04L 25/0292 375/257 |
| 2002/0152340 A1 * | 10/2002 | Dreps | G06F 13/4217 710/100 |
| 2003/0236939 A1 * | 12/2003 | Kleveland | H04L 7/005 710/305 |
| 2009/0171602 A1 * | 7/2009 | Hong | G01R 31/2837 702/65 |
| 2012/0294401 A1 * | 11/2012 | Lin | H04L 7/0041 375/362 |
| 2014/0270005 A1 * | 9/2014 | Sengoku | H04L 27/2071 375/330 |

* cited by examiner

*Primary Examiner* — Syed Haider
(74) *Attorney, Agent, or Firm* — Rory D. Rankin; Meyertons, Hood, Kivlin, Kowert & Goetzel, P.C.

(57) ABSTRACT

Systems, apparatuses, and methods for performing common mode extraction for data communication are disclosed. A circuit is configured to receive a single-ended data signal on a first input port and couple the data signal to a positive input terminal of a receiver component. The circuit is also configured to receive a differential clock signal on second and third input ports and generate a reference signal from the differential clock signal. In one embodiment, the reference signal is generated from an average of the differential clock signal. The circuit is configured to couple the reference signal to a negative input terminal of the receiver component. In one embodiment, the receiver component is an amplifier.

12 Claims, 6 Drawing Sheets

COMMON MODE EXTRACTION AND TRACKING FOR DATA SIGNALING

BACKGROUND

Description of the Related Art

Communication systems and electronic devices often include multiple processors or components that cooperate to perform various tasks, functions, or operations. Within a system or device, data may be communicated from one component to another component. As data rates increase in inter-chip communication, crosstalk, switching noise, reference voltage noise also tend to increase. For data communication using single-ended signals, common mode noise that is coupled into the transmitted signal will appear at the receiver and cause corruption of the data. In single-ended signaling, a single conductor (e.g., trace, wire) carries a varying voltage that represents the signal. In view of the above, improved methods and mechanisms for data communication are desired.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
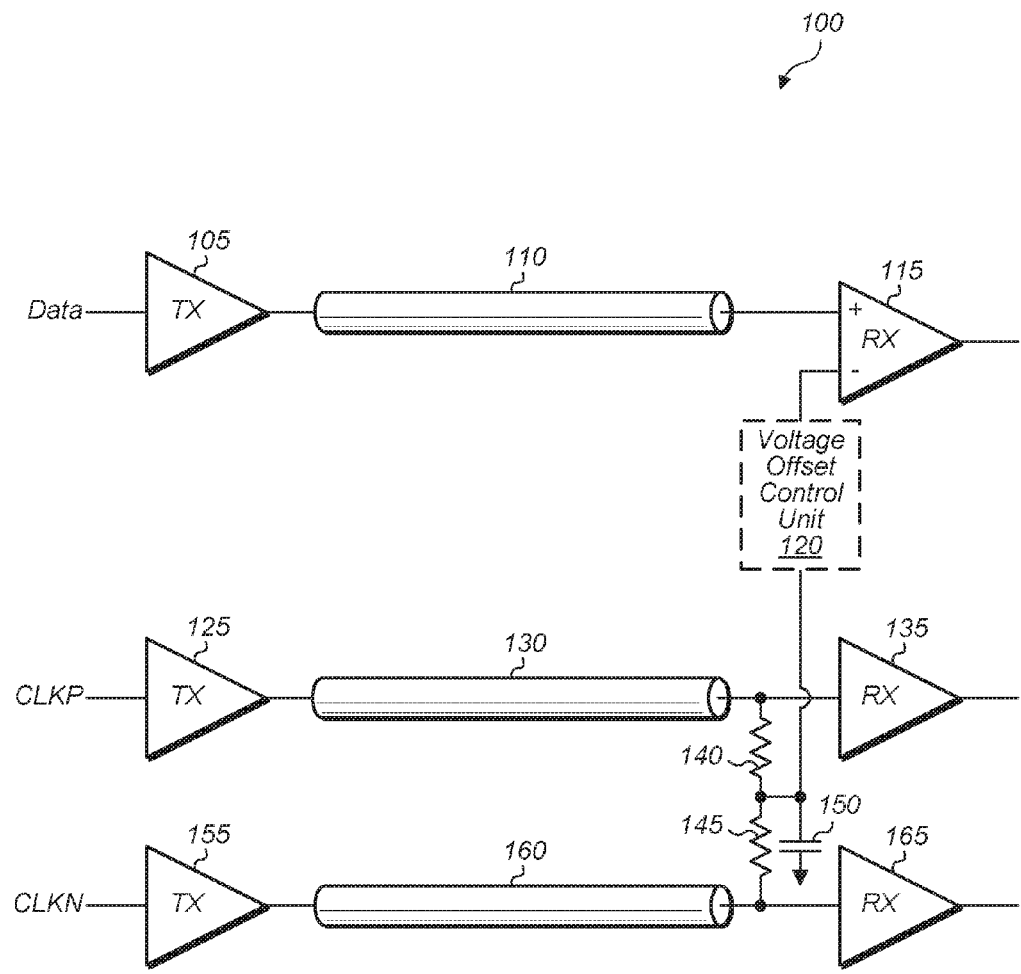
FIG. 1 is a block diagram of one embodiment of a circuit.

Systems, apparatuses, and methods for common mode extraction for data signaling are contemplated. In one embodiment, a circuit includes a plurality of input ports and a receiver component. The circuit is configured to receive a single-ended data signal on a first input port and couple the data signal to a positive input terminal of the receiver component. The circuit is also configured to receive a differential clock signal on second and third input ports. The circuit is configured to generate a reference signal from the differential clock signal and couple the reference signal to a negative input terminal of the receiver component. The reference signal tracks the common mode noise on the data signal and allows this noise to be reduced or eliminated by the receiver component. In one embodiment, the receiver component is an amplifier. In other embodiments, the receiver component is any of various other components (e.g., analog to digital converter (ADC)).

In one embodiment, the circuit also includes two resistors and a capacitor, and the circuit is configured to utilize the two resistors and the capacitor to generate the reference signal from an average of the differential clock signal. In one embodiment, the circuit is configured to couple a first signal component of the differential clock signal to a first end of a first resistor, couple a second signal component of the differential clock signal to a first end of a second resistor, couple a second end of the first resistor to a second end of the second resistor, couple the capacitor between the second end of the first resistor and ground, and utilize the second end of the first resistor as the average of the differential clock signal. In one embodiment, the circuit is configured to couple the second end of the first resistor to an input of a unity gain buffer and couple an output of the unity gain buffer to the negative input terminal of the receiver component. In one embodiment, the circuit is configured to add an optional voltage offset to the unity gain buffer. In one embodiment, the receiver component is configured to generate an output based on a comparison of the single-ended data signal to the reference signal.

In another embodiment, an apparatus includes a plurality of transmitters and a plurality of receivers. A first transmitter is configured to convey a single-ended data signal to a first receiver. A second transmitter is configured to convey a first signal component of a differential clock signal to a second receiver and a third transmitter is configured to convey a second signal component of the differential clock signal to a third receiver. In one embodiment, the first, second, and third transmitters are equivalent transmitters. In one embodiment, the plurality of transmitters are on a first die, the plurality of receivers are on a second die, with the second die being distinct from the first die. These and other features and advantages will become apparent to those of ordinary skill in the art in view of the following detailed descriptions of the approaches presented herein.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Referring now to FIG. 1, a block diagram of one embodiment of a circuit 100 is shown. Circuit 100 includes transmitters 105, 125, and 155, channels 110, 130, and 160, and receivers 115, 135, and 165, all interconnected substantially as shown. Circuit 100 also includes voltage offset control unit 120, resistors 140 and 145, and capacitor 150. Transmitter 105 is configured to send a single-ended data signal over channel 110 to the positive input terminal of receiver 115. It is noted that the term "channel" may also be referred to as a "bus", "transmission line", or "signal path". Depending on the embodiment, a channel is constructed using a trace, wire, cable, or any other suitable conductive material bounded by any suitable type of insulation material. It is also noted that the terms "terminal", "node", and "port" may be used interchangeably herein. The "positive input terminal" of receiver 115 may also be referred to as the "non-inverting input terminal" of receiver 115. In one embodiment, the term "single-ended signal" is defined as an electric signal which is transmitted using a single signal conductor.

In one embodiment, receiver 115 is an amplifier. In other embodiments, receiver 115 is any of various other types of components (e.g., analog to digital converter (ADC)). The negative input terminal of receiver 110 is coupled to the output of the voltage offset control unit 120. In another embodiment, the negative input terminal of receiver 110 is coupled to capacitor 150 at the midpoint between resistors 140 and 145. The "negative input terminal" of receiver 110 may also be referred to as the "inverting input terminal" of receiver 110.

Transmitters 125 and 155 are configured to send a differential clock signal on channels 130 and 160 to receivers 135 and 165, respectively. In one embodiment, the term "differential signal" is defined as an electric signal which is transmitted using two signal conductors. For example, in one embodiment, channel 130 carries a clock signal and channel 160 carries a complement of the clock signal. In one embodiment, transmitters 105, 125, and 155 are identical transmitters.

Circuit 100 couples the positive clock output of channel 130 through resistor 140 to capacitor 150, and circuit 100 couples the negative clock output of channel 160 through resistor 145 to capacitor 150. Effectively, circuit 100 generates the average of the differential clock signals using resistors 140 and 145. The midpoint of resistors 140 and 145 is coupled to capacitor 150 and is used as the voltage reference signal input to voltage offset control unit 120.

Circuit 100 optionally includes voltage offset control unit 120. In another embodiment, the midpoint of resistors 140 and 145 is coupled directly to the negative input terminal of receiver 115. In one embodiment, voltage offset control unit 120 includes a unity gain buffer with a low impedance output driver and an optional voltage offset.

In one embodiment, transmitters 105, 125, and 155 are on a first die of a first package and receivers 115, 135, and 165 are on a second die of the first package. Depending on the embodiment, the first and second die are silicon or other semiconductor die. In another embodiment, transmitters 105, 125, and 155 are on a first die of a first package and receivers 115, 135, and 165 are on a second die of a second package. In other embodiments, other structures for implementing transmitters 105, 125, and 155 and receivers 115, 135, and 165 are possible and are contemplated.

Figure 2:
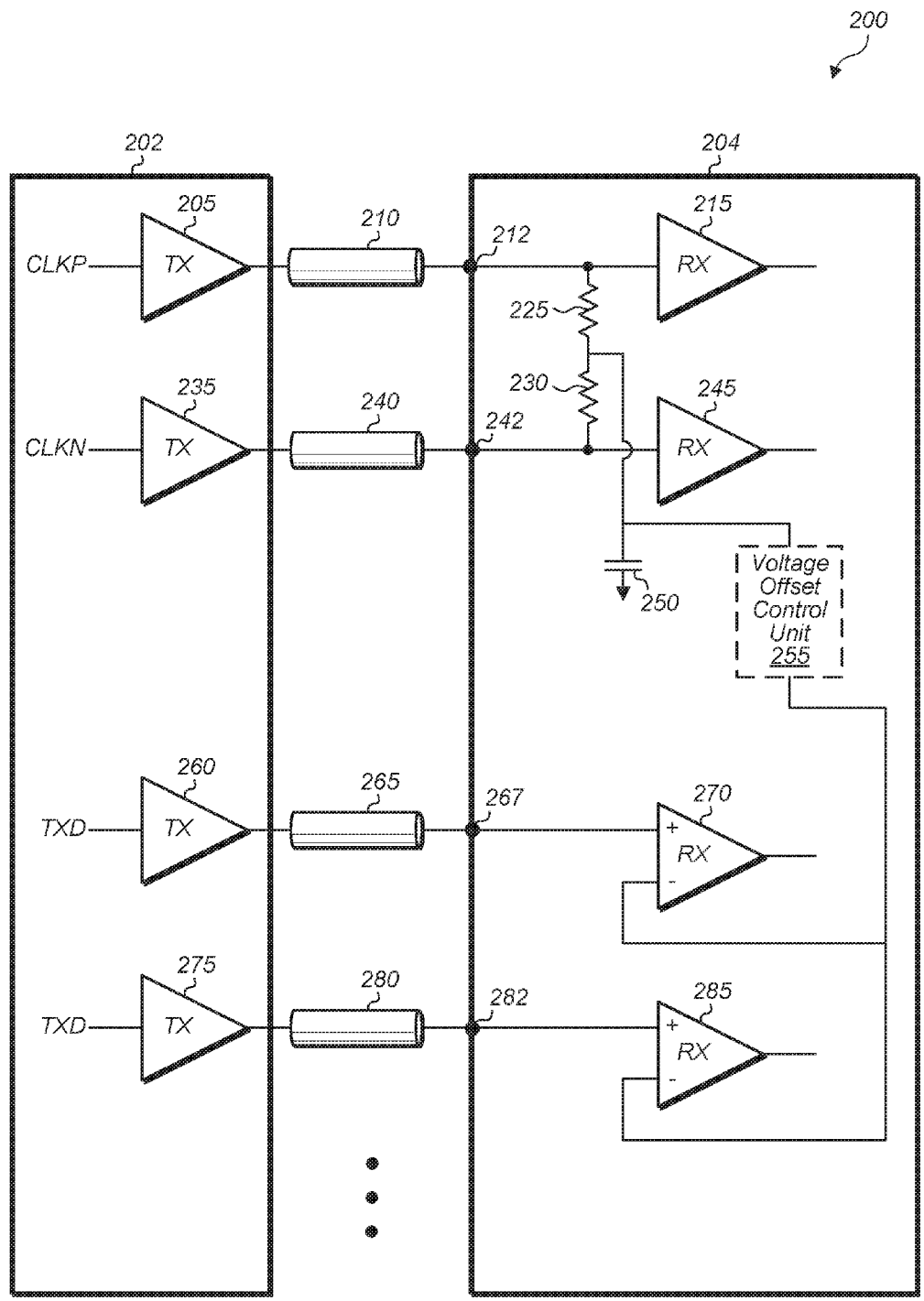
FIG. 2 is a block diagram of one embodiment of an apparatus.

Turning now to FIG. 2, a block diagram of one embodiment of an apparatus 200 is shown. Apparatus 200 includes die 202 with transmitters 205, 235, 260, and 275 and apparatus 200 includes die 204 with receivers 215, 245, 270, and 285. Channels 210, 240, 265, and 280 connect transmitters 205, 235, 260, and 275 on die 202 to receivers 215, 245, 270, and 285, respectively, on die 204. Transmitters 205 and 235 are configured to transmit a differential clock signal on channels 210 and 240. Circuit elements on die 204 are configured to generate a voltage reference signal from the average of the differential clock signals sent on channels 210 and 240. In one embodiment, the average of the differential clock signals is generated using resistors 225 and 230, and the average is coupled to capacitor 250 and voltage offset control unit 255. In one embodiment, circuit 200 optionally includes voltage offset control unit 255. In another embodiment, the midpoint of resistors 225 and 230 is directly coupled to the negative input terminals of receivers 270 and 285. In one embodiment, voltage offset control unit 255 includes a unity gain buffer with an optional voltage offset.

In one embodiment, die 204 include a plurality of input ports. The plurality of input ports include input ports 212, 242, 267, and 282. Signals received on input ports 212, 242, 267, and 282 are coupled to receivers 215, 245, 270, and 285, respectively. In various embodiments, input ports 212, 242, 267, and 282 may be bumps, micro-bumps, solder balls, pins, pads, leads, balls of a ball-grid array, or other connective components.

Die 202 includes transmitters 260 and 275 which are representative of any number of transmitters of single-ended data which are included within apparatus 200. In other embodiments, die 202 includes more than two transmitters of single-ended data. Each receiver 270 and 285 receives the voltage reference signal generated from the average of the differential clock signals sent on channels 210 and 240 and received by receivers 215 and 245. The voltage reference signal is coupled to the negative input terminals of receivers 270 and 285 to provide a reduction of the common mode noise on the received single-ended signals coupled to the positive input terminals from input ports 267 and 282, respectively.

Figure 3:
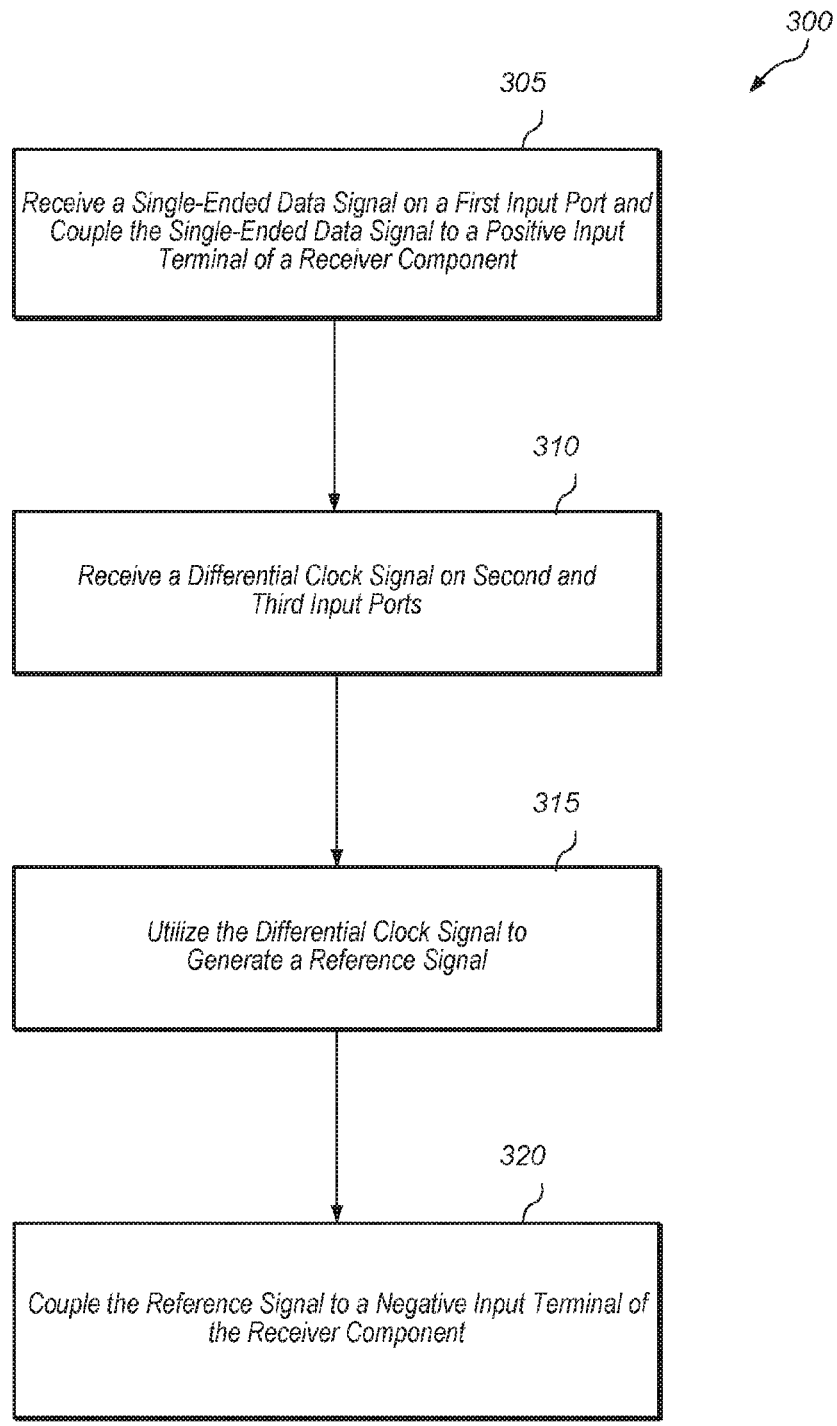
FIG. 3 is a generalized flow diagram illustrating one embodiment of a method for extracting a common mode reference signal from a differential clock path.
Figure 4:
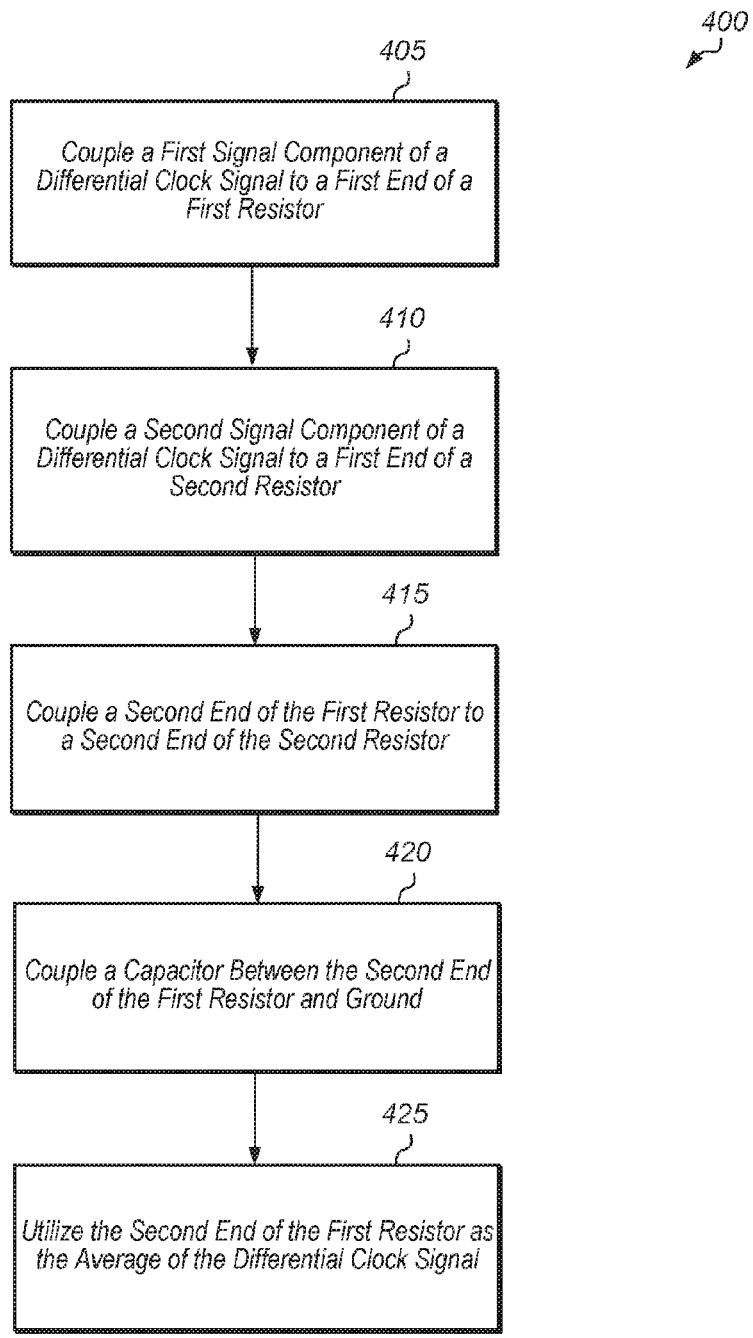
FIG. 4 is a generalized flow diagram illustrating one embodiment of a method for extracting a common mode reference signal from a differential clock path.
Figure 5:
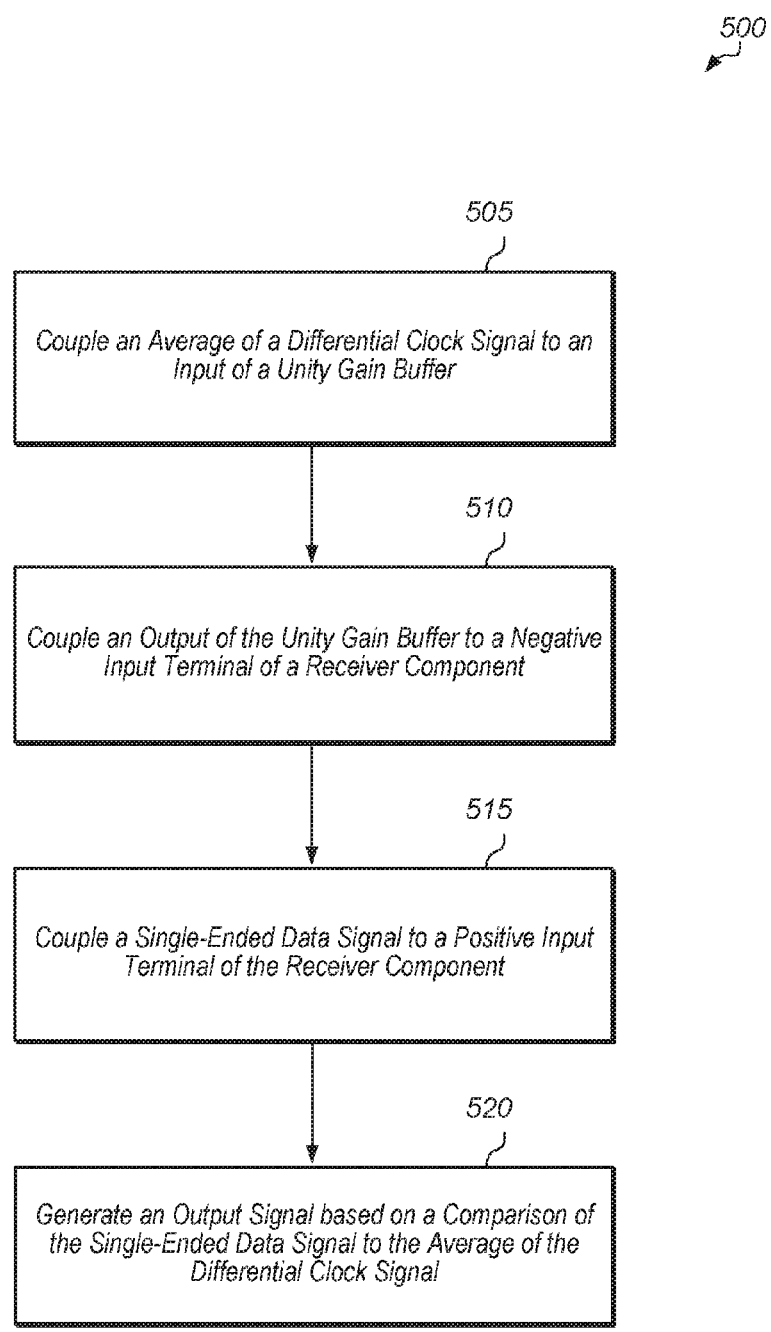
FIG. 5 is a generalized flow diagram illustrating one embodiment of a method for generating a reference signal.
Figure 6:
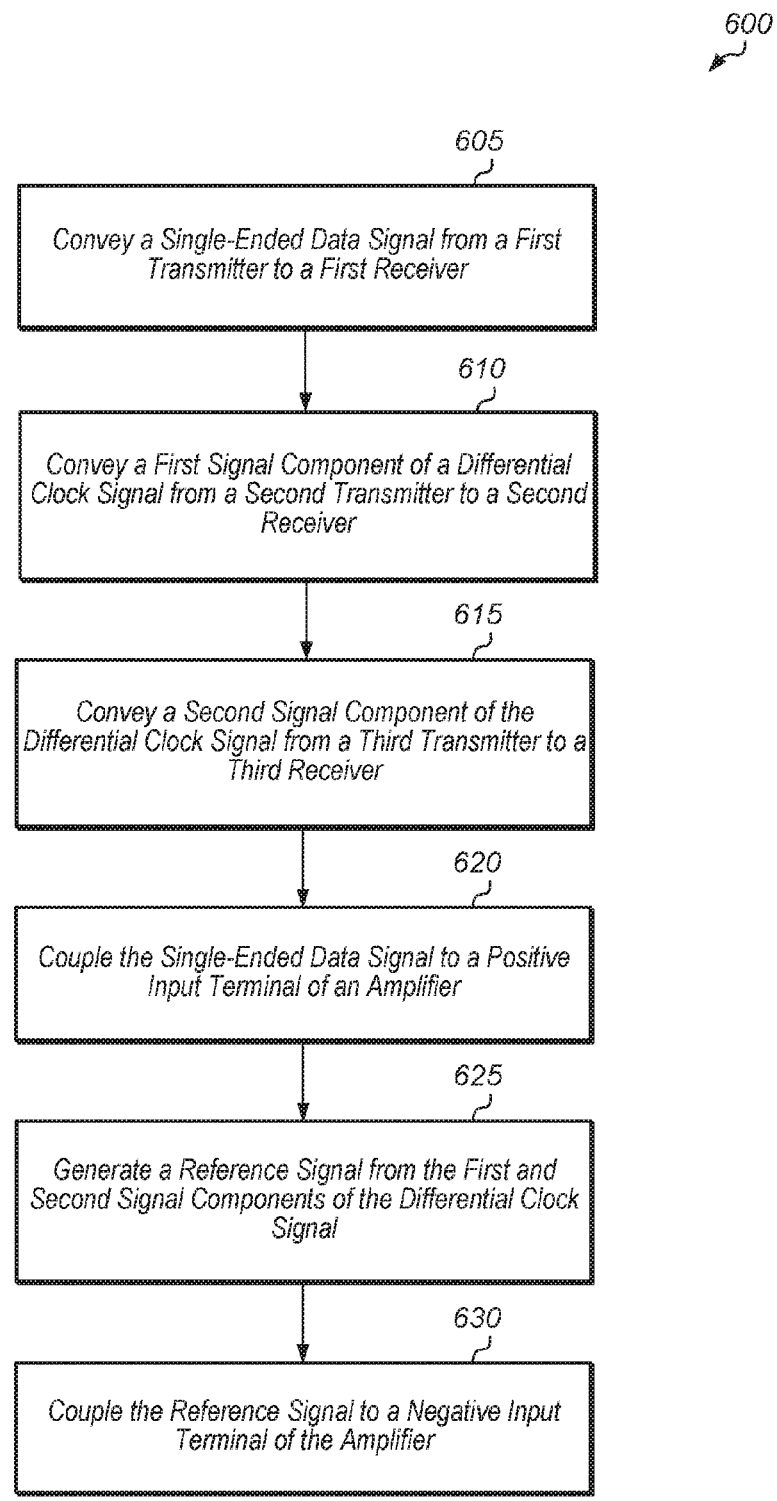
FIG. 6 is a generalized flow diagram illustrating one embodiment of a method for generating a reference signal.

Referring now to FIG. 3, one embodiment of a method 300 for extracting a common mode reference signal from a differential clock path is shown. For purposes of discussion, the steps in this embodiment and those of FIGS. 4-6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

A circuit receives a single-ended data signal on a first input port and couples the single-ended data signal to a positive input terminal of a receiver component (block 305). In one embodiment, the receiver component is an amplifier. In other embodiments, the receiver component is any of various other types of circuit components. The circuit also receives a differential clock signal on second and third input ports (block 310). The circuit utilizes the differential clock signal to generate a reference signal (block 315). The circuit couples the reference signal to a negative input terminal of the receiver component (block 320). The reference signal is utilized to provide rejection of the common mode noise on the single-ended data signal. After block 320, method 300 ends.

Turning now to FIG. 4, another embodiment of a method 400 for extracting a common mode reference signal from a differential clock path is shown. In the example shown, a circuit couples a first signal component of a differential clock signal to a first end of a first resistor (block 405). The circuit also couples a second signal component of the differential clock signal to a first end of a second resistor (block 410). The circuit also couples a second end of the first resistor to a second end of the second resistor (block 415). The circuit further couples a capacitor between the second end of the first resistor and ground (block 420). The circuit utilizes the second end of the first resistor as the average of the differential clock signal (block 425). After block 425, method 400 ends.

Referring now to FIG. 5, one embodiment of a method 500 for generating a reference signal is shown. In the example shown, a circuit couples an average of a differential clock signal to an input of a unity gain buffer (block 505). The circuit also couples an output of the unity gain buffer to a negative input terminal of a receiver component (block 510). In one embodiment, the receiver component is an amplifier. The circuit further couples a single-ended data signal to a positive input terminal of the receiver component (block 515). Then, the receiver component generates an output signal based on a comparison of the single-ended data signal to the average of the differential clock signal (block 520). After block 520, method 500 ends.

Turning now to FIG. 6, one embodiment of a method 600 for generating a reference signal is shown. In the example shown, a first transmitter conveys a single-ended data signal to a first receiver (block 605). Also, a second transmitter conveys a first signal component of a differential clock signal to a second receiver (block 610). Still further, a third transmitter is conveys a second signal component of the differential clock signal to a third receiver (block 615). In one embodiment, the first, second, and third transmitters are equivalent transmitters. Additionally, in one embodiment, the first, second, and third transmitters are on a first die, the first, second, and third receivers are on a second die, and the second die is different from the first die. In one embodiment, the first and second die are within the same package while in another embodiment, the first and second die are in separate packages.

The single-ended data signal is coupled to a positive input terminal of an amplifier (block 620). A reference signal is generated from the first and second signal components of the differential clock signal (block 625). Then, the reference signal is coupled to a negative input terminal of the amplifier (block 630). The reference signal tracks the common mode of the single-ended data signal which results in an increase in the eye diagram aperture. An eye diagram (or data eye) is informative as it helps characterize data transmission performance by showing the jitter and noise of the data signal. The eye diagram can be generated by capturing the bit transitions on a data lane of a channel. If the eye is not wide or high enough, then errors will be introduced into the received data. After block 630, method 600 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A circuit comprising:
a plurality of input ports; and
a receiver component;
wherein the circuit is configured to:
receive a single-ended data signal on a first input port of the plurality of input ports and couple the single-ended data signal to a positive input terminal of the receiver component;
receive a differential clock signal on second and third input ports of the plurality of input ports;
couple a first signal component of the differential clock signal to a first end of a first resistor;
couple a second signal component of the differential clock signal to a first end of a second resistor;
couple a second end of the first resistor to a second end of the second resistor;
couple a capacitor between the second end of the first resistor and ground; and
utilize the second end of the first resistor as an average of the differential clock signal;
couple the second end of the first resistor to an input of a unity gain buffer; and
couple an output, representing a reference signal, of the unity gain buffer to the negative input terminal of the receiver component.

2. The circuit as recited in claim 1, wherein the receiver component is an amplifier.

3. The circuit as recited in claim 1, wherein:
the receiver component is on a first die;
transmitters of the single-ended data signal and differential clock signal are on a second die; and
the second die is different from the first die.

4. The circuit as recited in claim 1, wherein the receiver component is configured to generate an output signal based on a comparison of the single-ended data signal to the reference signal.

5. An apparatus comprising:
a plurality of transmitters; and
a plurality of receivers;
wherein a first transmitter is configured to convey a single-ended data signal to a first receiver;
wherein a second transmitter is configured to convey a first signal component of a differential clock signal to a second receiver;
wherein a third transmitter is configured to convey a second signal component of the differential clock signal to a third receiver; and
wherein the first, second, and third transmitters are equivalent transmitters;
couple the first signal component of the differential clock signal to a first end of a first resistor;
couple the second signal component of the differential clock signal to a first end of a second resistor;
couple a second end of the first resistor to a second end of the second resistor;
couple a capacitor between the second end of the first resistor and ground;
utilize the second end of the first resistor as a reference signal;
couple the second end of the first resistor to an input of a unity gain buffer; and
couple an output of the unity gain buffer to a negative input terminal of an amplifier.

6. The apparatus as recited in claim 5, wherein the plurality of transmitters are on a first die, wherein the plurality of receivers are on a second die, and wherein the second die is different from the first die.

7. The apparatus as recited in claim 5, wherein the apparatus is configured to utilize two resistors and the capacitor to generate the reference signal as an average of the differential clock signal.

8. The apparatus as recited in claim 5, wherein the apparatus is configured to generate an output signal based on a comparison of the single-ended data signal to the reference signal.

9. A method comprising:
receiving a single-ended data signal on a first input port and couple the single-ended data signal to a positive input terminal of a receiver component;
receiving a differential clock signal on second and third input ports;
coupling a first signal component of the differential clock signal to a first end of a first resistor;
coupling a second signal component of the differential clock signal to a first end of a second resistor;

coupling a second end of the first resistor to a second end of the second resistor;
coupling a capacitor between the second end of the first resistor and ground; and
coupling the second end of the first resistor to an input of a unity gain buffer; and
coupling an output, representing a reference signal, of the unity gain buffer to a negative input terminal of the receiver component.

10. The method as recited in claim 9, wherein the receiver component is an amplifier.

11. The method as recited in claim 9, further comprising utilizing two resistors and the capacitor to generate the reference signal from an average of the differential clock signal.

12. The method as recited in claim 9, wherein:
the receiver component is on a first die;
transmitters of the single-ended data signal and differential clock signal are on a second die; and
the second die is different from the first die.

* * * * *